United States Patent
Porat

(10) Patent No.: US 7,920,472 B2
(45) Date of Patent: Apr. 5, 2011

(54) QUALITY OF SERVICE NETWORK AND METHOD

(75) Inventor: Haim Porat, Tel-Aviv (IL)

(73) Assignee: Tejas Israel Ltd, Herzelia Pituach (IL)

( * ) Notice: Subject to any disclaimer, the term of this patent is extended or adjusted under 35 U.S.C. 154(b) by 412 days.

(21) Appl. No.: 11/361,458

(22) Filed: Feb. 23, 2006

(65) Prior Publication Data

US 2006/0250959 A1    Nov. 9, 2006

(30) Foreign Application Priority Data

Feb. 23, 2005   (IL) .......................................... 167059

(51) Int. Cl.
H04L 12/28 (2006.01)
(52) U.S. Cl. ........................................ 370/232; 370/398
(58) Field of Classification Search .......... 370/229–240, 370/395.43
See application file for complete search history.

(56) References Cited

U.S. PATENT DOCUMENTS

| | | | |
|---|---|---|---|
| 5,881,050 A * | 3/1999 | Chevalier et al. ............. | 370/230 |
| 5,933,412 A | 8/1999 | Choudhury et al. | |
| 6,009,077 A * | 12/1999 | Firoiu et al. .................. | 370/230 |
| 6,282,197 B1 * | 8/2001 | Takahashi et al. .......... | 370/395.1 |
| 6,404,735 B1 * | 6/2002 | Beshai et al. ................. | 370/230 |
| 6,442,138 B1 * | 8/2002 | Yin et al. ....................... | 370/232 |
| 6,487,170 B1 * | 11/2002 | Chen et al. .................... | 370/231 |
| 6,522,629 B1 | 2/2003 | Anderson | |
| 6,763,000 B1 * | 7/2004 | Walsh ............................ | 370/252 |
| 6,771,598 B1 | 8/2004 | Andrews | |
| 6,791,941 B1 | 9/2004 | Dziong et al. | |
| 7,088,677 B1 * | 8/2006 | Burst, Jr. ....................... | 370/229 |
| 2002/0120767 A1 * | 8/2002 | Oottamakorn et al. ........ | 709/235 |
| 2002/0145982 A1 * | 10/2002 | Talpade et al. ................ | 370/253 |
| 2002/0150041 A1 | 10/2002 | Reinshmidt et al. | |
| 2002/0174246 A1 | 11/2002 | Tanay et al. | |
| 2002/0194362 A1 * | 12/2002 | Rawlins et al. ............... | 709/235 |
| 2003/0058851 A1 | 3/2003 | Goldman | |
| 2004/0128384 A1 | 7/2004 | Rolia et al. | |
| 2005/0007955 A1 * | 1/2005 | Schrodi ......................... | 370/230 |
| 2006/0002297 A1 * | 1/2006 | Sand et al. ..................... | 370/235 |

FOREIGN PATENT DOCUMENTS

| | | |
|---|---|---|
| JP | 2000-196664 | 7/2000 |
| JP | 2003-078556 | 3/2003 |
| JP | 2004-147060 | 5/2004 |

* cited by examiner

Primary Examiner — Chirag G Shah
Assistant Examiner — Jenkey Van
(74) Attorney, Agent, or Firm — Deborah Gador

(57) ABSTRACT

A configurable edge device for use in a network, the edge device being adapted and configured to be coupled to at least one other edge device in a network, and including an admission controller for controlling admission of data traffic onto a pre-defined flow over a physical link, and a router for routing the data traffic through the edge device onto the pre-defined flow in accordance with a pre-defined routing scheme, wherein operation of the admission controller and the router is controlled in accordance with data defining all physical and logical links in the network; a telecommunications carrier network for data traffic, the network including at least two such configurable edge devices, and a method for transmitting data traffic through such an edge device.

38 Claims, 5 Drawing Sheets

QUALITY OF SERVICE NETWORK AND METHOD

RELATED APPLICATION

This application is related to Israel Patent Application Serial No. 167059 filed on Feb. 23, 2005, entitled "NETWORK EDGE DEVICE AND TELECOMMUNICATIONS NETWORK," priority to which is claimed under 35 U.S.C. §119 and which is expressly incorporated herein by reference in its entirety.

FIELD OF THE INVENTION

The present invention relates to a network and method for providing pre-defined Quality of Service (QOS) for a packet or frame-switched network in general and, in particular, to a configurable edge device for a telecommunications network and method for providing QOS for data communication over carrier networks.

BACKGROUND INFORMATION

Packet switched networks generally are based on shared bandwidth topology. In this topology, each node has unlimited and uncontrolled access to network resources. A commonly used network access system, known as statistical multiplexing, transmits data simultaneously from any number of input devices attached to the network, and offers maximum utilization of the network's available bandwidth by assigning to each device unrestricted access to the network. However, with this kind of multiplexing, several inherent problems arise:

Network behavior is erratic and unpredictable due, in part, to collisions between data packets that different nodes are attempting to transmit at the same time.

Network resources are unfairly distributed, with ingress nodes which are closer to certain egress nodes getting much more bandwidth than ingress nodes which are remote from those egress nodes.

Traffic parameters, such as delay (the time lag between the departure of a signal from the source and the arrival of the signal at the destination) and jitter (the variance from the average delay), cannot be assured.

It is impossible to guarantee quality of service, in terms of assured bandwidth, bound delay and jitter, and packet loss, to differentiated customers or services, as defined in Service Level Agreements (SLAs).

Conventional solutions and practices for data networks involve adding complex management protocols, which generally are based on packet-by-packet traffic handling and heavy error correction and data integrity algorithms. These solutions, however, are based on local (per hop) calculations and information, and are prone to errors due to global dynamic changes, e.g., a sudden rise in network resource use in one node that causes the network to be congested for the time (typically, a few seconds) it takes for the resource management protocols to stabilize the network. With conventional dynamic networks, only over-engineering of the network can assure that the peak network use is adequately met without disturbing guaranteed traffic. This results in underutilization of network resources at other times.

One example of admission control of traffic based on per hop statistics is shown in US patent application 2004/0128384 to Rolia, et al. This application relates to admission control of applications in resource utility environments. The method of admission control includes determining the application's statistical demand profile for resources required by the application seeking admission; determining an assurance level of the resource utility; and admitting the application based on the statistical demand profile of the application, the assurance level of the resource utility, and statistical demand profiles of one or more applications currently hosted by the resource utility. This method utilizes no prior knowledge or rules of the applications resource usage, but only a computed statistical demand profile. Thus, it is limited in its efficiency as it has no knowledge of the state of the overall system.

Another example of a prior art solution is disclosed in U.S. Pat. No. 6,771,598 to Andrews. This patent describes a method for determining the admissibility of an offered session of traffic of a specified class to a server in a packetized communication network. The method involves defining an operating point for the server which represents the number of sessions of each respective class currently offered or currently being served, and determining whether this defined operating point falls within an admissible region. The admissible region consists of operating points for which the probability of violating a delay bound for any packet is below a threshold value. This method performs admission control based on calculation of each server's abilities based on some a priori knowledge of its behavior, and not based on actual traffic behavior throughout the network.

A further example is shown in U.S. Pat. No. 6,791,941 to Dziong, et al. This patent relates to tuning for connection admission control (CAC) algorithms in broadband ATM networks, which is accomplished using an overbooking technique based on aggregate effective bandwidth as an approximation to required bandwidth for given levels and classes of network traffic. This patent is based on a trial-and-error method for determining optimized rate control of each local traffic stream, and has no knowledge of the state of the network.

Furthermore, packet switched networks are (at the data link layer), connectionless, shared bandwidth networks which interconnect nodes in an arbitrary way. In order to establish a connection between the nodes for transmission of data, a routing mechanism is required. Current routing protocols are designed to cope with dynamic and unpredictable volumes of data transfer through networks that are characterized by dynamic topology composed of many nodes that communicate with each other in an arbitrary and random way. These networks are typically enterprise networks or the Internet. To address these problems, routing protocols are adapted to cause each router to continually learn the network topology and continually collect information about traffic status throughout the network, take note of the volume of data being routed through each node, calculate optimized routes for each possible connection and update routing tables at each routing node. Thus, each router computes, independently of the other routers, its own routing table, which is the basis for its forwarding decisions. The information is based on local (adjacent hops) information, as the individual routers have no knowledge of the overall traffic load or performance in the network. Therefore, it is sub-optimal, on one hand, as it does not take into account the other nodes in the network, while heavily burdening the routing node, on the other hand.

US Patent Application 20020150041 to Reinshmidt, et al. describes a method and system for improving the quality of service for transportation of selected data packets over an IP-based data network, such as the Internet. The method utilizes servers in the customer's environment, each of which serves as a source node or destination node. Preferably, for each link, several alternative paths are pre-selected. The servers contain unique software which allows the servers to exchange test packets between them to monitor and analyze the transportation parameters of each alternative path. When an optimal path is identified, the server modifies the header of the data packet, thereby causing the data packet to be forwarded to the destination node via the selected optimal path(s).

In this method, the paths are monitored between pairs of nodes and not globally. Furthermore, there is no provision for admission control of data to the network, so collisions are likely.

US Patent Application 2002/0174246 to Tanay, et al. describes a centralized system that computes routing tables for routers in an IP protocol network, and removes the task of computing routes from the individual routers. This system includes a network traffic statistics gathering system, a matrix formation and optimization system for classifying the traffic into classes and computing optimized routes for every traffic class according to the traffic statistics, and a distribution system for distributing routing tables, including information concerning the optimized routes, to the individual routers. This system, which is limited in use to an IP networking system, must learn the new topology state of the network whenever there is a change of any sort. Since these computations are required continually, the network is burdened with large quantities of computations, and automatically "updates" routing tables, substantially in real time, even if there are no changes, thereby slowing down data transfer in the network as a whole. In addition, this system has no provision for admission control of data to the network, leading to inefficient transfer of data traffic.

Carrier transport networks, for example, metro area networks, which are used to transport core data traffic, do not resemble enterprise networks or the global Internet. Rather, the carrier transport network is a conventional telephony network, and is characterized by different attributes:

The logical network's topology is usually mesh based.
The physical network is usually ring based.
The network consists of well-defined autonomous routing domains.
Each node is connected to specific node(s) within each domain.
Available routes are known and limited in number, and are static until the topography of the network changes.
All traffic of one service from one node within each routing domain is destined to a relatively small, finite and constant group of nodes.

These networks suffer from the disadvantage that they are inefficient. In order to ensure that all required traffic is transported over the network within a reasonable time, the network is often under-utilized. Thus, empty frames are often sent over the network.

Furthermore, it will be appreciated that the complex routing protocols described above, designed for generalized global and dynamic topology networks, which require constant updating of routing tables in accordance with the actual state of the various nodes in the network, are not suitable for establishing routes in the routing domain of a carrier network, such as a metro network. This is because they are too complex, and they are not resource efficient or cost efficient.

None of these prior art methods provides Quality of Service for data packets in metro and sub-networks of carrier networks, and so forth, which is close to optimal. Accordingly, there is a long felt need for a system for transmitting data packets over a network which provides QOS which is close to optimal and can be adjusted when required, having the stability and reliability of conventional carrier networks as well as the flexibility and adaptability of conventional global networks, and it would be very desirable to have such a system which provides more balanced utilization of network resources.

SUMMARY

It has now been appreciated that collisions are common in conventional networks, even if using an admission control protocol, such as those described above, since there are no fixed routes for the data, on the one hand and, on the other hand, collisions are also common in conventional networks having static routing since there is no admission control taking into account the quantity of data entering the network at any given time. The present invention solves this problem by providing a network in which all the routes through the network are defined in advance and are substantially static, and which also provides admission or rate control for all incoming data traffic. This substantially increases the efficiency of the network.

In particular, the present invention relates to an edge device for use in a communication network for transmitting data traffic over a bandwidth infrastructure, the edge device implementing admission control, preferably dynamic admission control based on global traffic information, and static or quasi-static routing, preferably quasi-static routing based on global network statistics, to provide pre-defined QOS for various customers in a packet-switched network.

While the invention is defined herein with regard to a network as a whole, it will be appreciated that it can be implemented in any selected sub-network, metro network, or other portion of a carrier network, as desired. Preferably, a large network will be divided into a plurality of sub-networks, each of which operates, independently, according to the present invention.

There is provided, according to an exemplary embodiment of the present invention, a configurable edge device for use in a network, the edge device being adapted and configured to be coupled to at least one other edge device in the network, and including an admission controller executing a software routine for controlling admission of data traffic onto a pre-defined flow over a physical link, and a router for routing the data traffic through the edge device onto said pre-defined flow in accordance with a pre-defined routing scheme, wherein operation of the admission controller and the router is controlled in accordance with data defining all physical and logical links in the network.

According to one exemplary embodiment of the present invention, the edge device is coupled to a data collector in the network for collecting and storing traffic data from at least some of the edge devices in the network, and to a calculator in the network for calculating reconfiguration data based on the collected data.

According to one exemplary embodiment of the invention, the calculator is adapted and configured to receive collected data from the data collector, to calculate traffic statistics, preferably for the entire network, from the collected data, and to calculate the reconfiguration data based on the calculated traffic statistics.

According to a preferred embodiment of the present invention, the edge device includes the calculator, and the edge device further includes a software routine, stored and executed in the processor, for calculating an admission scheme for admission of the data traffic through the edge device and for calculating a routing scheme for routing the data traffic through the edge device.

According to an alternative preferred embodiment of the present invention, the edge device is adapted and configured to be coupled to a central management device, the central management device including the calculator and a software routine stored and executed in the central management device, for calculating an admission scheme for admission of the data traffic through the edge device and for calculating a routing scheme for routing the data traffic through the edge device.

According to one exemplary embodiment of the present invention, the data collector is adapted and configured for collecting traffic bandwidth demand and allocation data from the edge device, and the calculator is adapted and configured for calculating traffic statistics for each edge device from the collected data, and calculating a configuration scheme for controlling admission based on the calculated traffic statistics.

According to another exemplary embodiment of the invention, the data collector is adapted and configured for collecting bandwidth utilization data from the edge device, and the calculator is adapted and configured for calculating bandwidth utilization statistics for each edge device in the network from the collected data, and calculating a routing scheme based on the bandwidth utilization statistics.

There is also provided, in accordance with an exemplary embodiment of the present invention, a telecommunications carrier network for data traffic, the network including at least two configurable edge devices, each including a processor for controlling admission of data traffic and for routing the data traffic through the edge devices according to a configuration scheme, and a calculator for calculating the configuration scheme.

According to a preferred embodiment of the invention, the network further includes a data collector coupled to the calculator for collecting traffic data from at least some of the edge devices, the calculator being adapted and configured to receive collected data from the data collector, to calculate traffic statistics, preferably for the entire network, from the collected data, and to calculate the configuration scheme based on the calculated traffic statistics.

According to one exemplary embodiment of the present invention, one of the edge devices includes the calculator, and that edge device further includes a software routine, stored and executed in the processor, for calculating an admission scheme for admission of the data traffic through the edge device and for calculating a routing scheme for routing the data traffic through the edge device.

According to an alternative exemplary embodiment of the present invention, the edge device is adapted and constructed to be coupled to a central management device, the central management device including the calculator and a software routine stored and executed in the central management device, for calculating an admission scheme for admission of the data traffic through the edge device and for calculating a routing scheme for routing the data traffic through the edge device.

There is also provided, in accordance with an exemplary embodiment of the present invention a method for transmitting data traffic through an edge device in a network having a processor, the method including providing a routing scheme, which is at least quasi-static, through the edge devices for the data traffic, and providing admission control for the data traffic through the edge device, both in accordance with a software routine in the network.

According to one exemplary embodiment of the present invention, the method further includes executing a software routine stored in a memory device in the network for calculating traffic statistics for every device in the network and generating therefrom the routing scheme and an admission control scheme.

There is still further provided, in accordance with an exemplary embodiment of the present invention, a computer-readable storage medium containing a set of instructions for a computer, the set of instructions, when executed by the computer, causing the computer to perform the following steps: calculating a configuration scheme for controlling admission of data traffic through at least two edge devices in a communication network for transmitting data traffic over a bandwidth infrastructure, and a routing scheme for routing the data traffic through the edge devices.

BRIEF DESCRIPTION OF THE DRAWINGS

The present invention will be further understood and appreciated from the following detailed description taken in conjunction with the drawings in which.

DETAILED DESCRIPTION OF EXAMPLE EMBODIMENTS

Figure 1:
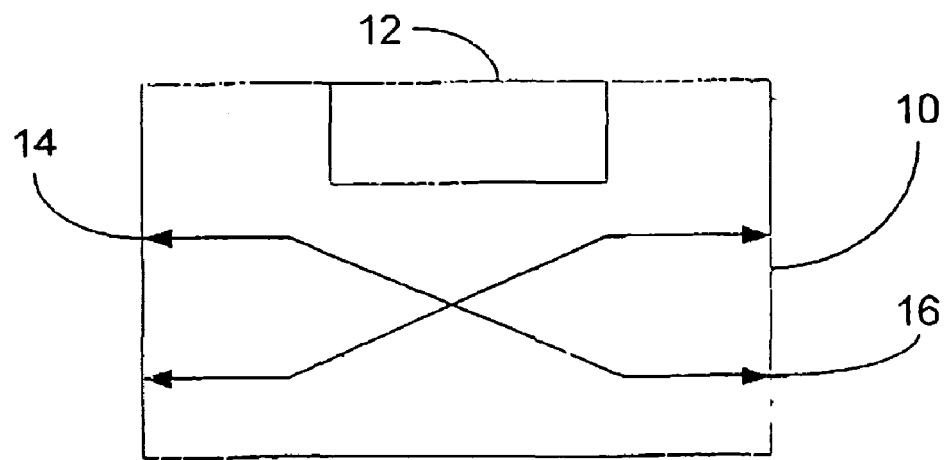
FIG. 1 is a block diagram illustration of an edge device, constructed and operative in accordance with one exemplary embodiment of the present invention.

The present invention relates to an edge device for a telecommunications network and to a telecommunications carrier network, particularly an Ethernet network, which is able to provide pre-defined Quality of Service (QOS) to its various customers. This is accomplished by providing the network with a static, or substantially static, routing scheme, together with dynamic admission control for all data traffic entering the network. The network includes a plurality of configurable edge switching devices, usually coupled to a core network, which implement both admission control for data traffic entering the edge devices, and static or quasi-static routing for the traffic through the network, both based on input knowledge of all the network physical and logical links. Preferably the system utilizes admission control based on bandwidth demand statistics throughout the entire network, and quasi-static routing based on network bandwidth utilization statistics throughout the entire network, to achieve the desired QOS while maintaining a substantially balanced usage of network resources.

The invention involves incorporating any admission control method with substantially static routing of data through the network (i.e., not IP routing, which continually changes), and implementing the admission control and the routing in one or more configurable edge devices. In an exemplary embodiment, the present invention relates to a system and method for achieving Quality of Service (QOS) guarantees for customers in a telecommunications network by dynamically adjusting rate controls and access to the network based on a priori knowledge of all the links in the network together with actual global traffic statistics (throughout the network), and by providing a routing scheme in which the flow routes are unchanging for a relatively long period of time, and the routing scheme is changed only when pre-defined criteria are met. This exemplary network utilizes an off-line algorithm which computes and periodically updates routing tables for each of the network devices of the network, based on network topology, network load statistics, and a set of Service Level Agreements (SLAs). Thus, the proposed method for a QoS algorithm uses global network data in order to dynamically control the ingress traffic rate so the network is controlled and bandwidth, jitter and delay are supplied according to the SLAs.

In particular, an exemplary embodiment of the present invention is implemented by configurable edge devices in a network, each edge device being adapted and configured to be coupled to at least one other edge device to form a physical link over which pass at least two flows. Each edge device includes an admission controller having a controller executing software routines for controlling admission of data traffic onto a pre-defined flow over the physical link, and a router for routing the data traffic through the edge device onto the pre-defined flow in accordance with a pre-defined routing scheme. In this exemplary embodiment, operation of the admission controller and the data traffic router is controlled in accordance with data defining all physical and logical links in the network.

Referring now to FIG. 1, there is shown a configurable edge device 10, having at least one ingress port 14 and at least one egress port 16, for use in a telecommunications carrier network, the edge device being adapted and configured to be coupled to at least one other edge device (not shown) in the network. Edge device 10 includes an admission controller 12 for controlling admission of data traffic and for routing the data traffic through the edge device in accordance with instructions received from a software routine in the network. Preferably, controller 12 includes means for receiving admission control instructions and for controlling admission in accordance therewith. It may also include a software routine or hardware for receiving reconfiguration data and for reconfiguring the edge device in accordance therewith. Controller 12 may be a processor disposed in the edge device running a software routine for carrying out admission control and/or routing instructions, or it may be implemented in hardware for carrying out such instructions, such as, e.g., an ASIC, etc., or it may be implemented in a processor executing software routines for both providing the instructions and carrying them out.

Figure 2:
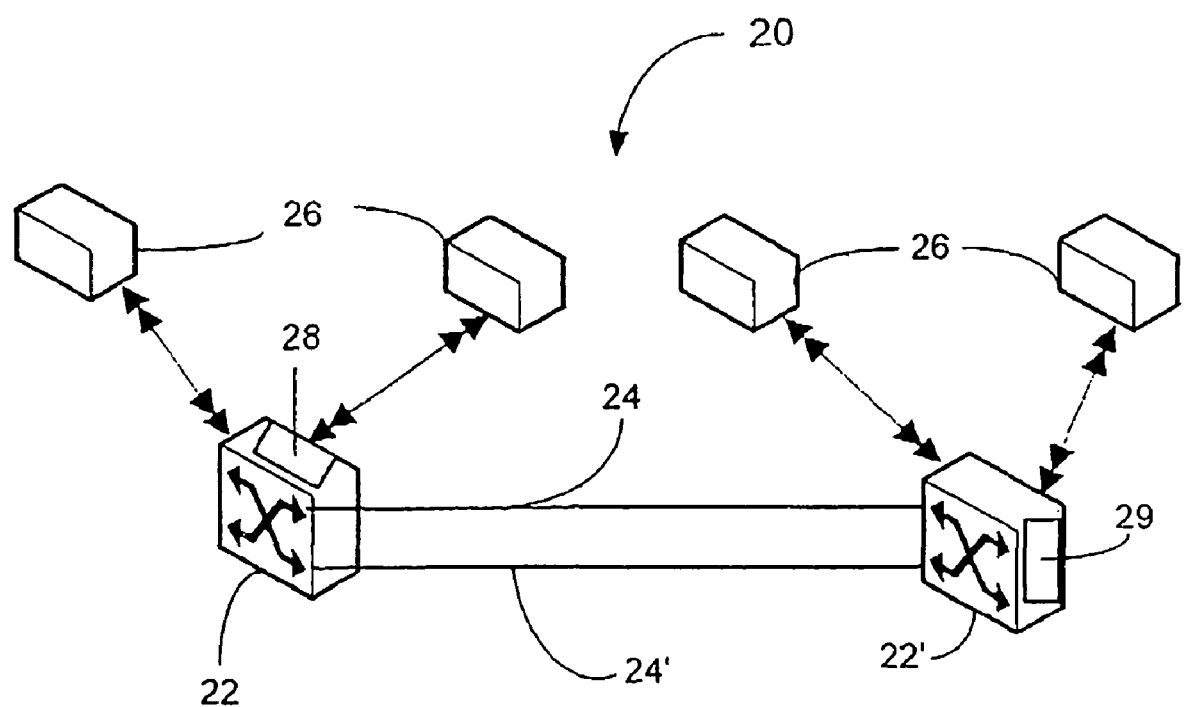
FIG. 2 is a schematic illustration of a minimal telecommunications network constructed and operative in accordance with one exemplary embodiment of the present invention.

One example of a minimal architecture for a telecommunications carrier network 20 for data traffic, constructed and operative in accordance with one exemplary embodiment of the present invention, is illustrated schematically in FIG. 2. The topology of this exemplary network is as follows. Two configurable edge devices 22, 22' (which here are also core devices) are coupled to one another, with at least two flows 24, 24' sharing the same physical link. A number of users 26 may be coupled to each edge device 22, 22' for transferring data over flows 24, 24' in accordance with Service Level Agreements (SLAs) defined in advance between the users and a service provider. These SLAs include, for each of the links, a wire rate bandwidth, a committed bandwidth (bandwidth assured for the users), and a best effort bandwidth (bandwidth to be provided for the users if, and only if, available at the time). Each edge device 22 and 22' includes an admission controller for controlling admission of data traffic and a router for routing the data traffic through the edge device according to instructions received from software routines executed in the network. In the minimalistic network illustrated in FIG. 2, the software routines may be stored and run in either or both of edge devices 22 and 22'. The physical link and the flows therethrough are known in advance, and details of the network topology are input into the network and utilized by the software routine for controlling admission and routing.

According to a preferred exemplary embodiment of the present invention, the network further includes a data collector including a controller for executing software routines for collecting traffic data from at least some of the edge devices, and a calculator coupled to the data collector, adapted and configured to execute software routing for calculating traffic statistics, preferably for the entire network, from the collected data, and for calculating an admission control scheme and/or a routing configuration scheme for the network, based on the calculated traffic statistics together with the input network topology details. The data collector 28 may be implemented in a software routine executed by a processor, or may be implemented in hardware, such as, e.g., an ASIC, etc. In the embodiment of FIG. 2, the data collector 28 and the calculator 29 may be located in either or both of the edge devices 22 and 22'.

Figure 3:
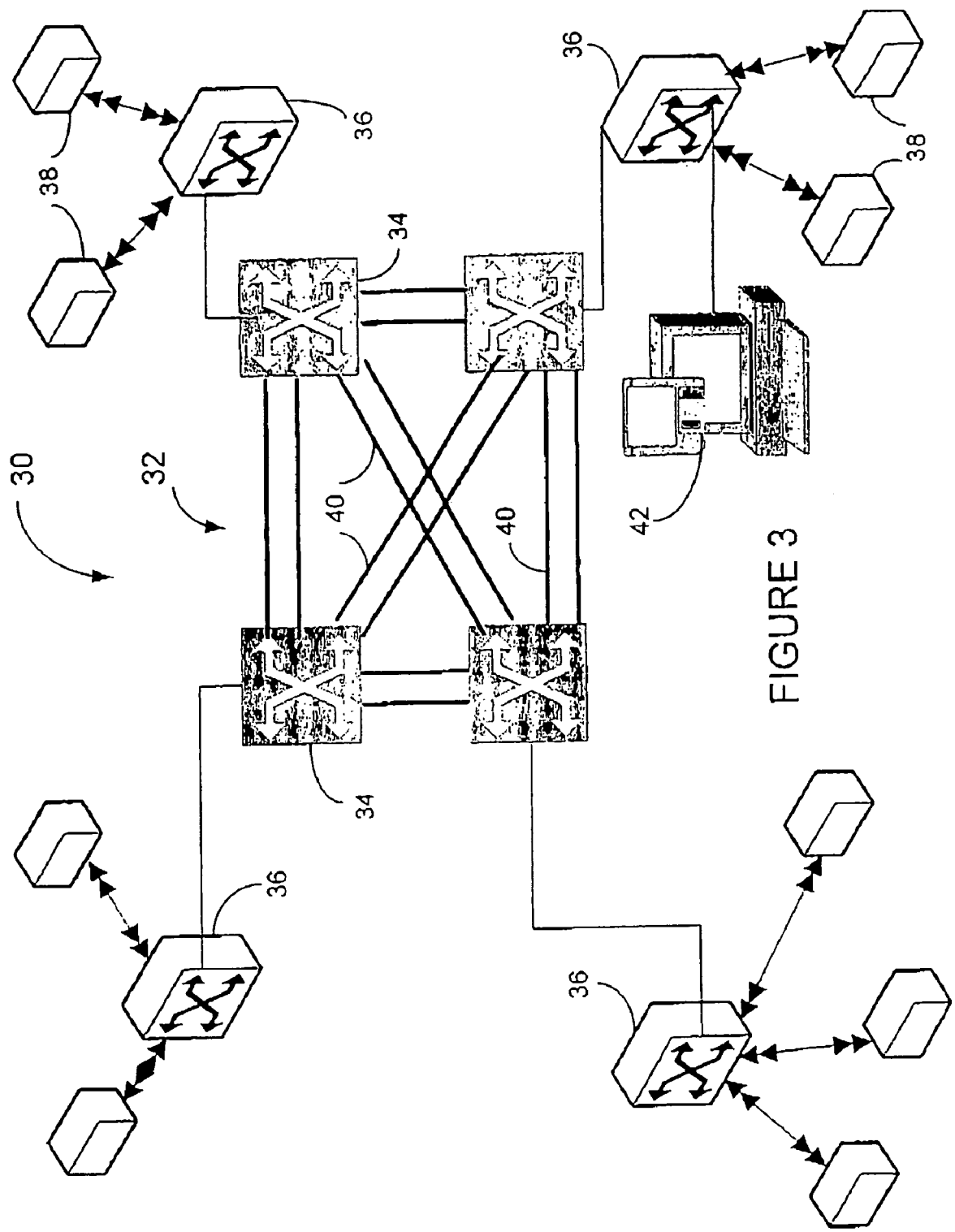
FIG. 3 is a schematic illustration of a telecommunications network constructed and operative in accordance with another exemplary embodiment of the present invention.

Another example of suitable architecture for a network 30 according to the present invention is illustrated schematically in FIG. 3. The QOS method of the present invention assumes a core network 32 of an arbitrary topology, including a plurality of core devices 34, that is surrounded by configurable edge switching devices 36. Preferably, no data packets are allowed into the network without passing through an edge device 36. The core network 32 may be virtual, e.g., implemented as guaranteed bandwidth slice of a TDM network. A plurality of users 38 may be coupled to each edge device 36 for sending and receiving data packets through network 30.

All traffic from the various users 38 through the core network 32 is assumed to be associated with one of a predefined set of flows 40. Each flow 40 is associated with specific routing and QOS requirements. These requirements are substantially static, i.e., changes in routing and/or QOS occur very slowly relative to the packet per second rate. The flow routing and QOS requirements are provided by a QOS algorithm according to the present invention, running in network 30. Details of the various physical links and flows through the network are input in advance into the network, and utilized by the QOS algorithm for calculating data admission control decisions and data routing. The core network 32 may be implemented using standard equipment. The minimal requirement from this equipment is to implement Ethernet switching, i.e., be able to correctly direct packets according to their MAC addresses in the context of the network's topology.

The network of the exemplary embodiment of FIG. 3 further includes a data collector for collecting traffic data from at least some of the edge devices. According to one embodiment of the invention, the data collector is incorporated in one or more of the edge devices 36. The data collected may include traffic bandwidth demand and allocation data from some or all of the edge devices, and/or bandwidth utilization data from some or all of the edge devices. The data collector is coupled to a calculator for calculating traffic statistics for each edge device from the collected data. These calculated traffic statistics may be utilized, together with the input details of the network topology, to calculate an improved admission scheme for controlling admission of data into the network based on bandwidth demand statistics and/or to calculate an improved routing scheme and an optimal configuration for the network based on bandwidth utilization statistics.

According to one exemplary embodiment of the present invention, network 30 also includes a central management station 42. Central management station 42 is preferably coupled to each of the edge devices 36 for sending and receiving data. According to one embodiment of the invention, the algorithm of the present invention is stored and runs in the central management station 42, instead of, or in addition to, in the edge devices. The central management station 42 receives traffic data from at least some of the edge devices and calculates appropriate routing and admission control schemes for the entire network. In this case, central management station 42 sends instructions to each of the edge devices for admission control through that edge device and for routing through that edge device.

It will be appreciated that any combination of data collector and calculator may be utilized. Thus, the data collector and the calculator may be located in one or more edge devices, in one or more core devices, both may be located in the central management station, or one may be located in one and the other located in another.

Figure 4:
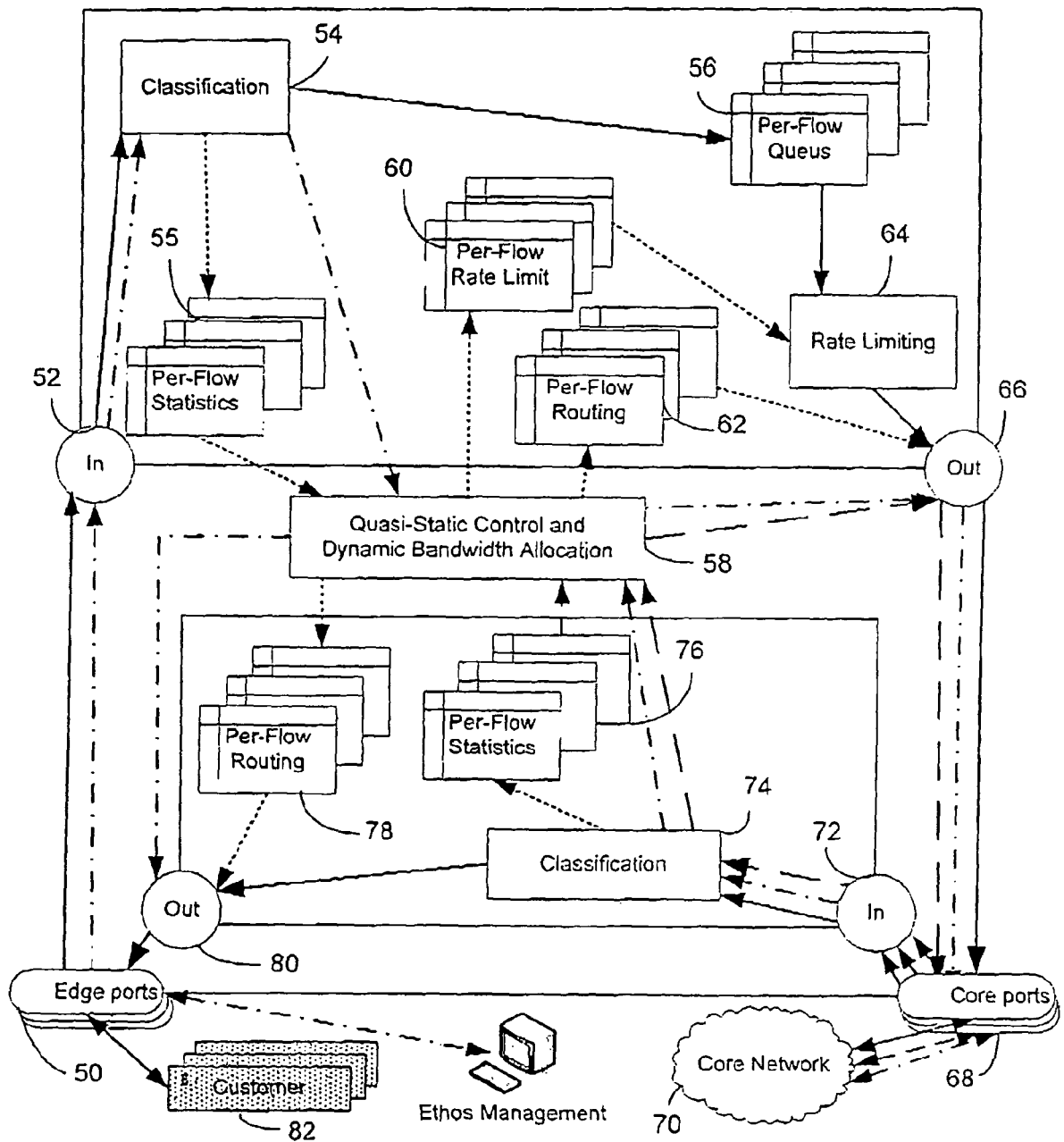
FIG. 4 is a flow chart of the operation of the network according to one exemplary embodiment of the present invention.

Referring now to FIG. 4, there is shown a schematic illustration of an exemplary packet processing method according to one exemplary embodiment of the present invention. The method of the invention includes two paths, a packet ingress path, for entry of a packet via a port 50 in an edge device into the core network, and a packet egress path, for exit of the packet from a port 68 in a core device in the core network. Each packet entering the network 52 via a configurable edge device goes through the following steps: First the packet is classified 54. Each incoming packet is associated with a particular flow, pre-defined through the network, using pre-defined classification rules according to the service level agreement of the customer for that type of traffic. These classification rules are generally unchanging, although they are updated offline whenever a change in a type or class of service (or bit rate) occurs.

After classification, data are collected 55 concerning the attempted bandwidth consumption for that flow, and traffic bandwidth consumption statistics for each flow are calculated and updated. The packet now undergoes "throttling", namely, the packet is delayed for a certain amount of time in a holding queue for its flow 56, thereby "throttling" the flow to each given bandwidth. The bandwidth allocated to each flow may change frequently (several times per second) according to the network statistics of traffic requesting ingress throughout the network at any given time, taken together with the fixed initial bandwidth allocations and collected traffic statistics (preferably without overloading the network).

The classification of each packet, together with the updated per flow statistics, are sent to a calculator 58 in the network, which stores and runs the algorithm of the present invention. Calculator 58 determines the per-flow rate limit 60 and informs each edge device of its current admission control instructions. Calculator 58 may also provide instructions for per-flow routing 62 for the edge switching devices, and, when certain criteria are met, may recalculate the per-flow routing for reconfiguration of the entire network.

In accordance with the above calculations, the packet now undergoes rate limiting 64 and, if admission is permitted, packet switching occurs 66. The packet is directed to one or more appropriate outgoing core ports 68 and enters the core network 70. Data may be collected 55, as by a data collector in one or more edge devices, concerning the actually allocated bandwidth consumption for the flow, and traffic bandwidth consumption statistics for that flow may be calculated and updated. Each flow is associated with one or more outgoing ports in a substantially static manner. Since the flows are throttled, the total packets bandwidth that is directed to any outgoing port is guaranteed not to exceed the bandwidth capacity of the port.

The operation in the egress packets pipeline is as follows. After entering the network, the packet is directed along its pre-defined route through the standard Ethernet core nodes in the core network 70, until it leaves the network through a core port 68 into a configurable edge device 72. Here, too, the packet is classified 74 and associated with a particular flow, using predefined classification rules. This classification may be simpler than for incoming packets, as the target MAC address may be sufficient in most cases. Optional allocated bandwidth data of the flow are collected 76 and transferred to the calculator 58, which calculates and updates statistics concerning the actual and attempted bandwidth consumption for that flow. These statistics may be sent to the edge devices or management station, for control purposes, such as verifying zero frame loss and delay guarantees. The calculator 58 provides instructions for per-flow routing 78. Now the packet is switched to one or more appropriate outgoing ports 80 leading to a port 50 in an edge device outside the core network for transmission to one or more customers 82. Again, since flows are throttled and since sufficient resources were allocated over the entire flow at the time the traffic entered the network, the total packets bandwidth that is directed to any network ingress port is known in advance and is guaranteed not to exceed the bandwidth capacity of that port. In the degenerated case where a packet leaves the network through the same edge switch it entered through, some of the above steps may be avoided.

According to one exemplary embodiment of the present invention, the algorithm running in the calculator provides dynamic bandwidth allocation, such as described in Applicant's co-pending Israeli patent application number 166615. This application describes a method for controlling admission of data traffic to a telecommunications network having an allocatable bandwidth, at least one physical link and at least two pre-defined flows over the link. The method includes receiving input data of each of the physical links in the network, the data including, for each of the links, a wire rate bandwidth, a provisioned committed bandwidth, and a provisioned best effort bandwidth; calculating a bandwidth available for best effort from the wire rate bandwidth and the provisioned committed bandwidth; and allocating the bandwidth available for best effort between the flows substantially proportionally to the provisioned best effort bandwidth. In a preferred embodiment, the method further includes collecting bandwidth demand and actual allocation data for each of the flows in the network, calculating a demanded committed bandwidth for each physical link and a demanded best effort bandwidth for each flow, calculating a bandwidth available for best effort from the allocatable bandwidth and the demanded committed bandwidth, and allocating the bandwidth available for best effort substantially proportionally between the demanded best effort bandwidths of the flows.

According to this exemplary embodiment, dynamic bandwidth allocation may be provided as follows. At least one, and possibly all, of the edge devices, and/or the management station, includes a processor and software (e.g., computer instructions stored on a computer-readable medium), used to calculate admission control instructions for the edge device to implement.

Each device running the algorithm is able to receive and interpret statistics packets so as to maintain its knowledge of the current global network state. This may require, for example, performing basic decompression and updating the statistics for all flows that enter the network through the various edge devices. In order to achieve maximum network resource utilization, generally no packets should be allowed into the network without passing through an edge device implementing these instructions (a proprietary edge device). However, it is possible to utilize these edge devices in a mixed environment with other, non-proprietary edge devices, with degraded results. In the latter case, each non-proprietary edge device is assumed to utilize the maximum allowed bandwidth it can use, so congestion and traffic loss will be avoided.

In the processors of the exemplary edge devices of the present invention are stored data identifying all the other edge devices in the network and all of the routes through the network. It will be appreciated that the minimum number of proprietary edge devices required to collect traffic data, and to determine the admission control scheme, is the number that permits all the bandwidth demand and allocation statistics of all the flows in the network to be collected or calculated by extrapolation. Provisioning tables, indicating the bandwidth guarantees to each flow, are also stored in each proprietary edge device.

The proprietary edge devices may be coupled to each other and to the management device, if any, for in-band management. Alternatively, the edge devices may be physically coupled to one another for out-of-band management.

According to this exemplary embodiment of the present invention, the optimized provisioning scheme for a given set of flows over a given network provided by the algorithm of the invention will ensure that all committed bandwidth flow requirements can be met and that excess network capacity is "fairly" distributed between all best effort bandwidth flow requirements. Computing such an optimal bandwidth resource allocation can be accomplished using any of several well-known optimization techniques such as constraint based algorithms.

Figure 5:
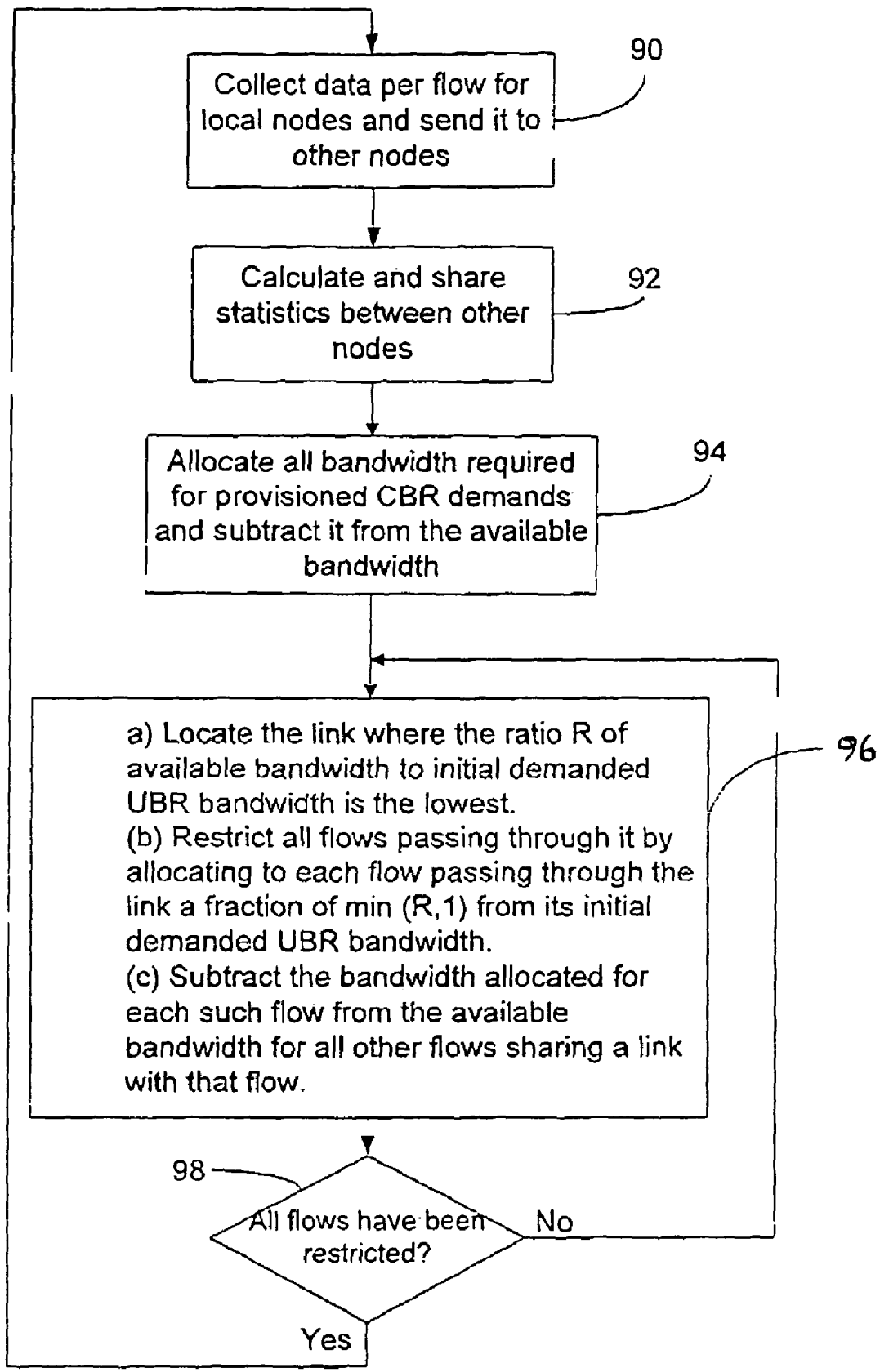
FIG. 5 is a flow chart illustrating a method for bandwidth allocation for use in providing a provisioning scheme for a network and during reconfiguration, according to one exemplary embodiment of the invention.

One example of a bandwidth allocation algorithm for use in providing a provisioning scheme for the network and during reconfiguration is illustrated in FIG. 5. It is a prerequisite that the network operator know the network parameters and the required services and/or logical links. An initial division into flows and routes is provided for the start of operation of the network.

Details of the various classes of service provided to each customer are input into the management device's software (e.g., via a user interface including, e.g., an input device such as a keyboard, a mouse, and/or a graphical user interface), which distributes it to the necessary edge devices, or directly into one or more edge devices. Details of the various logical links and each flow's bandwidth demands, as well as an initial amount of CBR (Committed Bit Rate) and UBR (Unspecified Bit Rate) for each flow, are also input to the device or devices, which performs an initial bandwidth distribution calculation. This means that, for each physical link, the bandwidth required for current CBR demands of that link is allocated, and this amount is subtracted from the total available bandwidth, known as the wire rate, for that link. The device now performs a "sanity check", i.e., it verifies that all the services can be provided (e.g. that the sum of CBR traffic at any link is no greater than the maximum permitted bandwidth). If the sanity check is not passed, the user is informed and corrected provisioning CBR/UBR data must be input to the device.

Periodically (preferably several times a second), each edge device which has collected data and/or extrapolated traffic data broadcasts this information to the other edge devices and/or to the management device which are running the network algorithm, using any standard signaling protocol (block 90) and receives statistics from all the other devices (block 92).

These edge devices each store the bandwidth allocation algorithm which calculates the optimal allocation at any given time. Given knowledge of each flow's bandwidth demands, as well as the most recently updated provisioning tables (specifically, the amount of CBR and UBR for each flow), each edge device independently computes the amount of bandwidth to allocate for each flow that enters the network through it. It will be appreciated that, since each edge device receives all the statistics from all other edge devices, and since each edge device has the same software, all the edge devices will calculate the identical amount of bandwidth to be allocated at any given time to which flows. Alternatively, the central management device may make all the calculations, and using the software, reach an optimal bandwidth allocation scheme, which it then distributes to each of the edge devices.

The algorithm used should ensure that CBR requirements are met and that excess network capacity is fairly allocated between UBR requirements. This is accomplished, for example, by allocating all the bandwidth required for current CBR demands for every link, and subtracting this amount from the total available bandwidth for that link (block 94). Now the following three steps are carried out (block 96): (a) The link where the ratio R of available bandwidth to demanded UBR bandwidth is the lowest is located; (b) All flows passing through this link are restricted in a fair manner, i.e., each flow passing through the link is allocated a function of R of its demanded UBR bandwidth, consisting of min (R,1) where $$R = \frac{WR - \sum CBR_{Demanded}}{\sum UBR_{Demanded}},$$

WR being the wire rate bandwidth of the link, meaning that each flow is allocated either: the fraction of its demanded UBR bandwidth obtained by multiplying the demanded bandwidth by R, or the total demanded bandwidth for that flow, whichever is smaller; and (c) The bandwidth allocated for each such flow is now subtracted from the available bandwidth for all other flows passing through any of the same links that this flow passes through. These three steps are repeated until all the edge devices have been considered and all the flows have been restricted (block 98), at which time the entire process is repeated from block 90.

It will be appreciated that this algorithm is run, for example, several times a second, at the same frequency at which statistics updates are exchanged. Preferably, this occurs every one tenth of a second. The complexity of the algorithm is a function of the number of flows in the network and the number of edge devices.

The previous example does not limit the various dynamic rate control algorithms which may be utilized in the present invention. It will be appreciated by those skilled in the art that, alternatively, any other dynamic rate or admission control algorithm can be used to improve the optimization of the network. Similarly, any admission control algorithm that ensures that CBR requirements are met can be used.

While the present invention is operative in any network having a static (substantially unchanging) configuration, the efficiency of the network can be significantly increased by utilizing a substantially static routing scheme which is changed periodically to another substantially static routing scheme. In this case, the calculator may receive the following inputs:

Network topology—available nodes and connections and their associated parameters, such as available bandwidth, origin node destination node etc.

Required links—The services that need to be provisioned with their associated parameters, such as required bandwidth, origin node destination node, type of traffic (unicast, multicast, broadcast) required service (CIR, PIR).

The calculator ensures that it is possible to provision the requested routes and calculates the best route allocation across the network. The calculation results are translated into static routing tables, which are uploaded into the corresponding network nodes. Static routing allocation solutions can be obtained using any of several optimization techniques.

According to one exemplary embodiment of the present invention, the algorithm running in the calculator provides quasi-static routing control, as described in Applicant's co-pending Israeli patent application number 166390. This application describes a method for routing data over a telecommunications carrier network including at least two switching devices defining at least one physical link. The method includes defining in advance a plurality of traffic flows, each associated with specific routing through at least one of the physical links in the network; configuring a routing system according to the traffic flows; collecting data of traffic transmitted over at least some of the traffic flows, calculating traffic statistics for each of the flows in the network, based on the collected data; and re-calculating the routing system configuration utilizing the calculated traffic statistics. According to a preferred embodiment, the method also includes defining in advance at least one pre-selected criterion for recalculation of the routing system configuration; determining whether at least one of the pre-selected criteria is met; and re-calculating the routing system configuration only when at least one pre-selected criteria is met.

This example of a substantially static routing system is as follows. Details of the topology of the network, the physical links required by the various customers, and required flows (logical links) are parameters which are input (e.g, via a user interface including, e.g., an input device such as a keyboard, a mouse, and/or a graphical user interface), into the calculator. A preliminary provisioning table is generated from this data and optimal routes, based only on these input parameters, are computed. Appropriate routing tables are generated and each of the network devices is configured accordingly. The network begins to run using these static routes and continues to run unchanged until pre-defined criteria are met.

While the network is operating, a number of switching devices throughout the network continuously collect data regarding traffic over each route. This data is stored in the network and processed to provide traffic statistics. According to a preferred embodiment, all the network devices, both core devices and edge devices, collect and transmit data of traffic entering and leaving that device. According to an alternative embodiment, only the edge devices collect traffic data since, using statistics only from the edge devices, it is possible to extrapolate the statistics of the core devices, as all ingress and egress ports are monitored and all routes are known. According to yet another embodiment, traffic data is only collected in a limited number of devices, which are sufficient to extrapolate all traffic statistics for the entire network. All the collected data may be sent to the management station for storage and for processing off-line.

In this embodiment, a number of criteria for reconfiguration of the network devices also may be input into the management station, any one of which is sufficient to trigger recalculation of the routing scheme and possible reconfiguration of the network. Some examples of suitable criteria are as follows, although other criteria may be selected by the user, in addition to or instead of these criteria. A first criterion is a change in network topology due to the addition or removal of a physical link. A second criterion is a change in provisioning or flows of at least one logical link over the existing topology. In each of these cases, the user inputs (via, e.g., a user interface) new parameters for the network, the routing scheme is re-defined, and updated routing tables are generated, all off-line. The updated routing tables are provided to each network device together with instructions for synchronization of reconfiguration of the devices, at which time the network changes to the new static route scheme.

Further according to this exemplary embodiment of the present invention, the system may also consider other criteria for triggering route computation. For example, the pre-selected criteria for computing a new routing scheme may include one or all of the following additional events:

A change in one or more selected traffic statistic, for example, bandwidth utilization above a pre-defined probability threshold value (a function of distribution of bandwidth utilization mean and variance over time) of at least one logical link.

Lapse of a pre-selected period of time since the previous computation or reconfiguration.

A repeating pattern of bandwidth utilization above a user defined probability value, size of change, and length of time threshold value, for example, a repeated reduction in certain locations from Friday afternoon to Sunday evening.

Once the new routing scheme is calculated, additional criteria may be utilized in order to determine whether or not to reconfigure the network according to the newly calculated routing scheme. The preferred criterion is the probability that the newly calculated routing scheme will provide improved performance (improvement of one or more network metrics) as compared with the current routing scheme. Thus, once the alternative routing scheme is computed, its effect on total network throughput or other metrics detailed hereafter (even distribution, minimal delay, etc.) is calculated and compared to current network metrics. If there is no improvement or if the level of improvement does not reach a pre-set threshold value, the routing tables will not be updated at this time. If the improvement is expected to be greater than a pre-set threshold value, and the probability that the improvement will have this value reaches a minimum pre-set threshold value, for example, a 90% probability that the throughput will increase by at least 10%, and if a time threshold of a minimum period of time between successive route changes pre-selected by the end user is met, updated routing tables are prepared according to the new routing scheme and provided to each network device, together with instructions for synchronization of reconfiguration of the devices, at which time the network changes to the new static route scheme.

Figure 6:
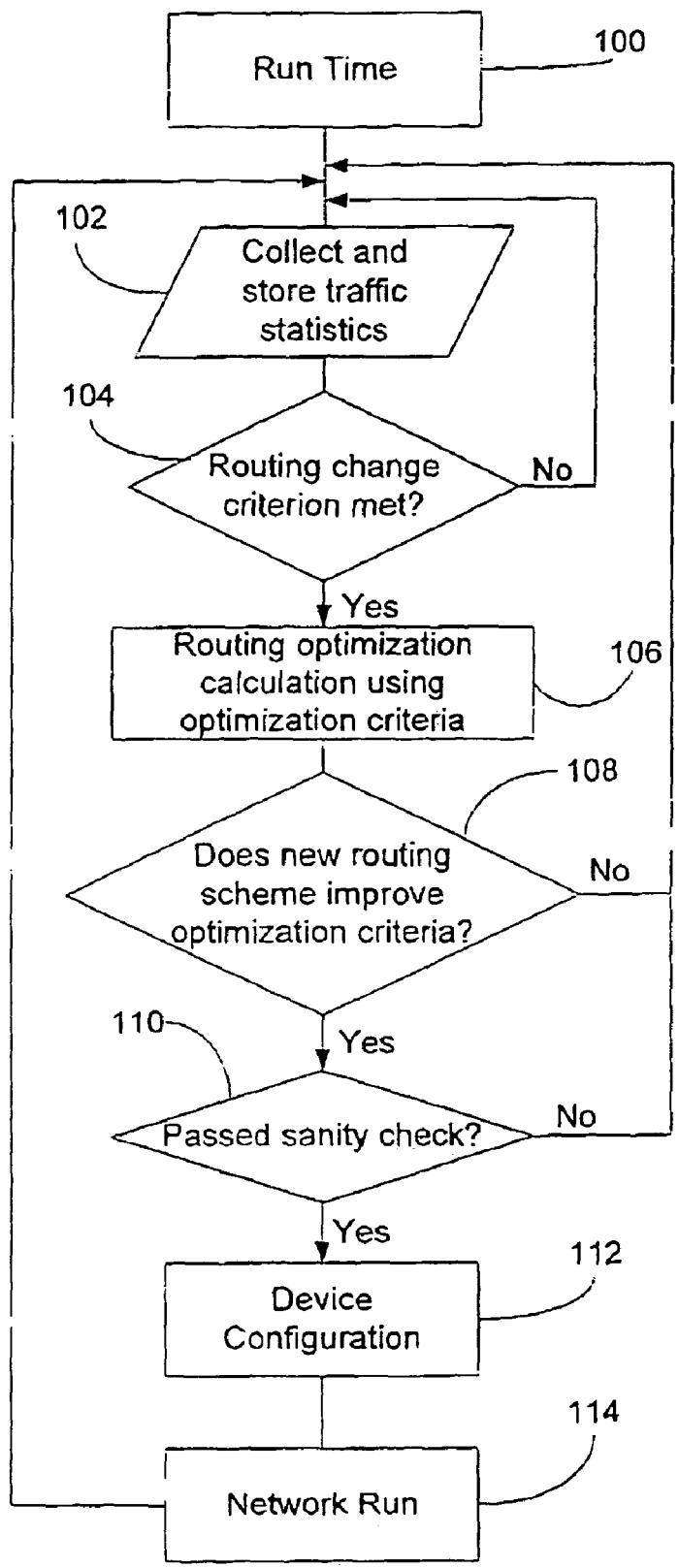
FIG. 6 is a flow chart illustrating a network run-time mode of operation of a network according to another exemplary embodiment of the invention.

Referring now to FIG. 6, there is shown a flow chart illustrating a network run-time mode of operation of a network according to another exemplary embodiment of the invention. In this mode of operation, the network routing is adapted to network traffic patterns when pre-defined criteria are met. In other words, the system collects and stores information about the data traffic loads over time passing through the various nodes, and updates itself accordingly, so as to approach an optimum utilization of network resources.

Thus, the network runs for a period of time utilizing the device configuration generated using the original input parameters, or the device configuration most recently updated by the network (block 100). While the system is running, each network device collects statistics (block 102) about the utilization of each physical link connected to it, in terms of bandwidth usage over time. This information is sent to the calculator using any signaling protocol. The calculator stores the data and processes the data to calculate various traffic statistics, particularly mean bandwidth utilization or demand, its variance, and bandwidth and variance distribution over time, as well as a probability of bandwidth utilization. When at least one pre-defined criterion for a routing change is met (block 104), the management station initiates recalculation of the routing scheme based on the calculated traffic statistics (block 106). This routing optimization calculation utilizes optimization criteria selected by the user in advance and input into the calculator. These criteria may include utilizing the shortest possible paths, providing substantially uniform distribution of traffic in the network, increasing traffic throughput through the core network (bandwidth entering and leaving the network), among others, as selected by the user.

According to this embodiment of the present invention, recalculation of the routing scheme and reconfiguration of the network are not dynamic, i.e. occurring in real-time, but rather take place only when threshold values of pre-defined criteria are reached. For example, as stated above, the management station calculates traffic statistics, including the mean and variance distribution over time and, from these, the probability value of bandwidth utilization, for each of the logical flows. This bandwidth probability value is compared with the input bandwidth utilization probability threshold value. As long as the detected bandwidth utilization changes with a probability lower than the input value or for less than the minimal period of time, the management station continues to collect and store information and process it to traffic statistics (block 102).

When the detected bandwidth utilization changes with at least the input probability for a period of time above the minimum threshold value, the management station executes route optimization and calculates a new routing scheme for the network (block 106), utilizing the collected and calculated traffic data and statistics together with the various input network parameters. In this way, the recalculated and updated routing scheme is better adapted to network behavior, and is adapted to provide better and more uniform distribution of traffic over the entire network (as by offloading busy paths and loading unused paths), to provide maximum usage of cheaper paths (using cost function), and/or taking into account any other criteria the user defines. It will be appreciated that all these steps are preferably performed off-line while the network is running. This means that changes in the routing scheme are implemented relatively slowly relative to the data transfer rate through the network.

The calculator now determines whether the newly calculated routing scheme increases the network throughput (the total delivered bandwidth) or any other chosen metrics for the network (block 108). If not, the management station continues to collect and store information and process the information into traffic statistics (block 102). If the metrics are improved, the management station performs a sanity check (block 110).

Once the sanity check is passed, the management station converts the routing paths, computed at the previous steps, to routing tables for the new device configuration (block 112), including, in Ethernet networks, MPLS label forwarding tables, MAC (Media Access Control) or any other type of classifier, and sends configuration commands to the various configurable switches using any standard management protocol. Once this has been done and verified, it is preferably put into effect "simultaneously" through the whole network, assuming reasonable clock coherence between the nodes. This may be ensured by utilizing, for example, a GPS clock. Alternatively, assuming every core node has a direct link to at least one configurable switch, it is sufficient to synchronize the configurable edge switches and have the edge nodes simultaneously trigger the update in the core nodes. Thus, all the switches are synchronized so that conversion to the new routing paths occurs substantially simultaneously. At that time, the network starts running using the newly configured routes (block 114).

It will be appreciated that the combination of the preferred dynamic admission control based on data traffic statistics from the entire network with the preferred substantially static routing scheme based on data traffic statistics from the entire network ensures that all data traffic entering the network will be able to follow its entire route through the network without collisions, and that only data traffic whose entire route is available will be permitted to enter the network.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A configurable edge device for use in a network, the edge device being configured to be coupled, via at least one core device, to at least one other edge device in a network, the configurable edge device comprising:

an admission controller for providing, over the entire network, per flow, rate limiting admission control of committed ingress data traffic and, if available bandwidth remains, of best effort (Unspecified Bit Rate (UBR)) ingress data traffic into the network onto a pre-defined path over a physical link to the core device, wherein the core device is without per flow admission control capability, and the per flow rate limiting admission control is implemented according to admission control instructions for admitting data to the traffic network at a given time according to bandwidth allocated for said traffic over said entire pre-defined path of said traffic from edge device to edge device through the network;

wherein said admission controller dynamically allocates, at said edge devices, to data traffic at each said link, said available UBR bandwidth as a function of (i) provisioned UBR bandwidth for each said flow in said network, (ii) available UBR for each flow at each said link in said network, and (iii) a total UBR bandwidth demanded by each flow at each said link at a given time in said network, and allocating to each flow a portion of said demanded best effort bandwidth of said flow, in accordance with Service Level Agreements (SLA) for each said flow;

a router for routing said ingress data traffic through said edge device onto said pre-defined path in accordance with a pre-defined routing scheme for the entire network; and a memory configured to store the admission control instructions and the pre-defined routing scheme in advance of the data traffic being received at the edge device;

wherein operation of said admission controller and said router is controlled in accordance with data defining all physical and logical links in the network;

wherein said pre-defined routing scheme is a substantially static routing scheme which is changed periodically to another substantially static routing scheme.

2. The edge device according to claim 1, further comprising a software routine stored and executed in the network, for calculating an admission scheme for admission of said ingress data traffic into the network through the edge device and for providing to the edge device instructions for implementing a routing scheme for routing said data traffic through the network.

3. The edge device according to claim 2, the edge device being constructed to be coupled to a central management device, wherein said software routine is stored and runs in said central management device.

4. The edge device according to claim 2, wherein said software routine is stored and runs in one or more of said edge devices.

5. The edge device according to claim 2, further comprising a data collector for collecting traffic bandwidth demand and allocation data from said edge device; and wherein said software routine is further configured for calculating traffic statistics for each edge device from said data and for providing instructions for controlling admission into the network based on said traffic statistics.

6. The edge device according to claim 2, further comprising a data collector for collecting bandwidth utilization data from said edge device; and
wherein said software routine is further configured for calculating bandwidth utilization statistics for each edge device in the network from said data, and for providing a routing scheme based on said bandwidth utilization statistics.

7. The edge device of claim 1, wherein said pre-defined routing scheme is a static scheme.

8. The edge device of claim 1, wherein said pre-defined routing scheme is a substantially static routing scheme which is changed periodically to another substantially static routing scheme in response to a change in provisioning or flows.

9. A telecommunications carrier network for data traffic, the network comprising:
at least two configurable edge devices coupled to one another via at least one core device to form at least one physical link with at least two flows over each physical link, each edge device comprising:
an admission controller for providing, over the entire network, per flow rate limiting admission control of committed ingress data traffic and, if available bandwidth remains, of best effort ingress Unspecified Bit Rate (UBR) data traffic into the network onto a pre-defined path over a physical link to the core device, wherein the core device is without per flow admission control capability, and the per flow rate limiting admission control is implemented according to admission control instructions for admitting a portion of data traffic to the network according to said bandwidth allocated for said traffic over the entire pre-defined path of said traffic from edge device to edge device through the network;
wherein said admission controller dynamically allocates, at said edge devices, to data traffic at each said link, said available UBR bandwidth as a function of (i) provisioned UBR bandwidth for each said flow in said network, (ii) available UBR for each flow at each said link in said network, and (iii) a total UBR bandwidth demanded by each flow at each said link at a given time in said network, and allocating to each flow a portion of said demanded best effort bandwidth of said flow, in accordance with Service Level Agreements (SLA) for each said flow;
a router for routing said ingress data traffic through said edge device onto said pre-defined path in accordance with a pre-defined routing scheme for said entire network; and
a memory configured to store the admission control instructions and the pre-defined routing scheme in advance of the data traffic being received at the edge device; and
wherein operation of said admission controller and said router is controlled in accordance with data defining all physical and logical links in the network.

10. The telecommunications carrier network according to claim 9, further comprising a software routine in the network for controlling operation of said admission controller and said router, in accordance with data defining all physical and logical links in the network.

11. The telecommunications carrier network according to claim 10, further comprising a central management device coupled to said edge devices, wherein said software routine is stored and runs in said central management station.

12. The telecommunications carrier network according to claim 10, wherein said software routine is stored and runs in one or more of said edge devices.

13. The telecommunications carrier network according to claim 10, further comprising at least one core device, wherein said software routine is stored and run in one or more of said core devices.

14. The telecommunications carrier network according to claim 10, further comprising a data collector for collecting data of traffic bandwidth demand and allocation through said edge device; and wherein said software routine is further configured for calculating traffic statistics for each edge device from said data and for controlling admission to the network based on said traffic statistics.

15. The telecommunications carrier network according to claim 10, further comprising a data collector for collecting bandwidth utilization data from said edge device; and wherein said software routine is further configured for calculating bandwidth utilization statistics for each edge device in the network from said data, and for providing a routing scheme based on said bandwidth utilization statistics.

16. A method for transmitting data traffic through an edge device configured to be coupled, via at least one core device, to at least one other edge device to form at least one physical link in a network, the method comprising:
controlling, at the edge device, per flow, quantity and rate of admission of committed ingress data traffic and, if available bandwidth remains, of best effort ingress Unspecified Bit Rate (UBR) data traffic into the network through the edge device onto a pre-defined path over a physical link through the network to the core device,
wherein the core device is without per flow admission control capability, and the per flow admission and rate of admission control is implemented according to admission control instructions;
dynamically allocating, at said edge devices, to data traffic at each said link, said available UBR bandwidth as a function of (i) provisioned UBR bandwidth for each said flow in said network, (ii) available UBR for each flow at each said link in said network, and (iii) a total UBR bandwidth demanded by each flow at each said link at a given time in said network, and allocating to each flow a portion of said demanded best effort bandwidth of said flow, in accordance with Service Level Agreements (SLA) for each said flow;

admitting said portion of said data traffic to the network according to said bandwidth allocated for said traffic over said entire pre-defined path of said traffic from edge device to edge device through the network;

routing said ingress data traffic through said edge device onto said pre-defined path in accordance with a pre-defined routing scheme over the entire network; and storing in a memory of the edge device the admission control instructions and the pre-defined routing scheme in advance of the data traffic being received at the edge device;

wherein said steps of controlling admission and routing data traffic are controlled in accordance with data defining all physical and logical links in the network; and wherein said pre-defined routing scheme is a substantially static routing scheme which is changed periodically to another substantially static routing scheme.

17. The method according to claim 16, further comprising:
collecting traffic bandwidth demand and allocation data from said edge device;
calculating traffic statistics for each edge device from said data; and
controlling admission of data traffic into the network through said edge device based on said traffic statistics.

18. The method according to claim 16, further comprising:
collecting bandwidth utilization data from said edge device;
calculating bandwidth utilization statistics for each edge device in the network from said data; and
providing a routing scheme based on said bandwidth utilization statistics.

19. The method according to claim 16, further comprising:
classifying an incoming packet by associating said incoming packet with a particular flow, pre-defined through the network, using pre-defined classification rules;
holding said packet in a holding queue for said associated flow, where said incoming packet is delayed for a certain amount of time so as to throttle said flow to an associated bandwidth;
receiving data of said classification and per flow traffic statistics;
determining a per-flow rate limit; and providing said edge device with admission control instructions.

20. The method according to claim 19, further comprising:
determining per-flow routing for the edge switching devices, and providing said edge device with routing instructions.

21. A non-transitory computer-readable storage medium containing a set of instructions for a computer, the set of instructions, when executed by the computer, causing the computer to perform the following steps:
controlling, at an edge device, per flow, admission and rate of admission of committed ingress data traffic and, if available bandwidth remains, of best effort ingress Unspecified Bit Rate (UBR) data traffic to a network through the edge device, coupled via at least one core device to at least one other edge device in the network, onto a pre-defined flow over a physical link through the network, wherein the core device is without per flow admission control capability, and the per flow admission and rate of admission control is implemented according to admission control instructions;
dynamically allocating, at said edge devices, to data traffic at each said link, said available UBR bandwidth as a function of (i) provisioned UBR bandwidth for each said flow in said network, (ii) available UBR for each flow at each said link in said network, and (iii) a total UBR bandwidth demanded by each flow at each said link at a given time in said network, and allocating to each flow a portion of said demanded best effort bandwidth of said flow, in accordance with Service Level Agreements (SLA) for each said flow;
admitting said portion of said data traffic to the network according to said bandwidth allocated for said traffic over said entire pre-defined path of said traffic from edge device to edge device through the network;
routing said ingress data traffic through said edge device
routing said ingress data traffic through said edge device onto said pre-defined flow in accordance with a pre-defined routing scheme over the entire network; and
storing in a memory of the edge device the admission control instructions and the pre-defined routing scheme in advance of the data traffic being received at the edge device;
wherein said pre-defined routing scheme is a substantially static routing scheme which is changed periodically to another substantially static routing scheme; and
wherein said steps of controlling admission and routing data traffic are controlled in accordance with data defining all physical and logical links in the network.

22. An edge device, comprising:
an admission controller configured to selectively admit a portion of best effort (Unspecified Bit Rate (UBR)) data traffic received at the edge device to a core network according to admission control instructions by dynamically allocating, at said edge device, available UBR bandwidth for each flow at said edge device as a function of (i) provisioned UBR bandwidth for each said flow in said network, (ii) available UBR bandwidths for each flow at each said link in said network, and (iii) a demanded UBR bandwidth by each flow at each said link in said network at a given time, thereby allocating to each flow a portion of said demanded best effort bandwidth of said flow, in accordance with Service Level Agreements (SLA) for each said flow;
wherein the core network includes a plurality of data paths and is without per flow admission control capability;
said admission control instructions admitting said data to the network according to said bandwidth dynamically allocated for said traffic over the entire pre-defined path of said traffic from edge device to edge device through the network;
a router configured to route admitted data across the core network according to routing instructions; and
a memory configured to store the admission control instructions and the routing instructions in advance of the data being received at the edge device.

23. The edge device of claim 22, wherein the admission controller, under control of the admission control instructions, implements admission control so that admitted data does not exceed a data transmission bandwidth capability of the core network.

24. The edge device of claim 22, wherein the selective admission of data includes throttling of at least some received data before it is admitted to the core network.

25. The edge device of claim 22, wherein the admission control and routing instructions are determined based on network traffic data and a predetermined configuration of the data paths of the core network.

26. The edge device of claim 25, further comprising:
a processor configured to determine the admission control and routing instructions.

27. The edge device of claim 26, wherein the network traffic data is collected by the edge device and devices of the core network.

28. The edge device of claim 26, wherein the processor includes the admission controller and the router.

29. The edge device of claim 26, wherein the processor is configured to generate new admission control and routing instructions only in response to network traffic data satisfying a predetermined criterion.

30. The edge device of claim 26, wherein the processor is configured to determine if the new admission control and routing instructions improve an optimization criterion.

31. The edge device of claim 22, wherein the memory is configured to store a provisioning table having a committed bit rate (CBR) and an unspecified bit rate (UBR) for each of a plurality of data flows through the core network.

32. The edge device of claim 31, further comprising:
a processor configured to, for each of a plurality of data links of the network compute a total CBR by summing the stored CBRs of the data flows associated with the data link, compare the total CBR to an available bandwidth for the data link, and in response to the total CBR being greater than the available bandwidth for the data link, send a message to a management device.

33. An edge device, comprising:
an admission controller configured to selectively admit data traffic received at the edge device to a core network according to admission control instructions by dynamically allocating, at said edge device, available Unspecified Bit Rate (UBR) bandwidth for each flow at said edge device as a function of (i) provisioned UBR bandwidth for each said flow in said network, (ii) available UBR bandwidths for each flow at each said link in said network, and (iii) a demanded UBR bandwidth for each flow at each said link in said network, wherein the core network includes a plurality of data paths and is without per flow admission control capability;
said admission control instructions admitting said data to the network according to said bandwidth allocated for said traffic over the entire pre-defined path of said traffic through the network;
a router configured to route admitted data across the core network according to routing instructions; and
a memory configured to store the admission control instructions and the routing instructions in advance of the data being received at the edge device,
wherein the memory is configured to store a provisioning table having a committed bit rate (CBR) and an unspecified bit rate (UBR) for each of a plurality of data flows through the core network,
wherein the processor is configured to determine the admission control instructions by:
for each of the plurality of data links, allocating bandwidth for the total CBR of data flows associated with the data link, and determining a remaining available bandwidth for the data link by subtracting from the available bandwidth of the data link the allocated total CBR bandwidth;
determining the data link having a smallest ratio of remaining available bandwidth to total UBR, wherein the total UBR is a sum of the UBR for the data flows associated with the data link;
allocating a UBR bandwidth to each data flow of the data link having the smallest ratio in the amount of the UBR for the data flow multiplied by a factor having a value selected from a group consisting of (i) the ratio of remaining available bandwidth to total UBR, and (ii) 1; and
subtracting from the remaining available bandwidth of other data links the allocated UBR bandwidth of each data flow of the data link having the smallest ratio upon a determination that the data flow passes through the other data links.

34. A data-transmission network, comprising: an edge device including:
an admission controller configured to selectively admit a portion of best effort Unspecified Bit Rate (UBR) data traffic received at the edge device through a core network according to admission control instructions according to bandwidth dynamically allocated for said data over an entire pre-defined path of said data from edge device to edge device through the network, by dynamically allocating, at said edge device, available UBR bandwidth for each flow at said edge device as a function of (i) provisioned Unspecified Bit Rate (UBR) bandwidth for each said flow in said network, (ii) available UBR bandwidths for each flow at each said link in said network, and (iii) a demanded UBR bandwidth by each flow at each said link in said network at a given time, thereby allocating to each flow a portion of said demanded best effort bandwidth of said flow, in accordance with Service Level Agreements (SLA) for each said flow;
a router configured to route admitted data across the core network according to pre-defined routing instructions; and
a memory configured to store the admission control instructions and the routing instructions in advance of the data being received at the edge device; and
the core network, including a plurality of data paths and being without per flow admission control capability.

35. The data-transmission network of claim 34, wherein the admission controller, under control of the admission control instructions, implements admission control so that admitted data does not exceed a data transmission bandwidth capability of the core network.

36. The data-transmission network of claim 34, wherein the selective admission of data includes throttling of at least some received data before it is admitted to the core network.

37. The data-transmission network of claim 34, wherein the admission control and routing instructions are determined based on network traffic data and a predetermined configuration of the data paths of the core network.

38. The data-transmission network of claim 37, further comprising a processor configured to determine the admission control and routing instructions, wherein the processor includes the admission controller and router.

* * * * *